Patented Feb. 11, 1941

2,231,018

UNITED STATES PATENT OFFICE

2,231,018

PREGNANOLONE COMPOUNDS AND METHOD OF OBTAINING THE SAME

Russell Earl Marker, State College, Pa., assignor to Parke, Davis & Company, Detroit, Mich., a corporation of Michigan No Drawing. Application July 3, 1937, Serial No. 151,834. Renewed March 20, 1940

7 Claims. (Cl. 260—397)

The invention relates to a new keto alcohol, epi-pregnan-ol-3-one-20 and its isolation in pure state from mixtures with other sterol derivatives of closely related chemical composition.

This application is a continuation in part of my co-pending application, Serial No. 130,582, filed March 12, 1937, in which the isolation of epi-allo-pregnan-ol-3-one-20, an isomer of the new compound of the application, is described. In said co-pending application, an example is described wherein the carbinol residues, after extraction of phenolic compounds from human pregnancy urine, are converted into a mixture of the corresponding water-soluble acid mono-ester salts of a dibasic acid. The mixture of mono-ester salts in aqueous solution then has hydrocarbons and other impurities removed therefrom by shaking the latter out with water-immiscible solvent. The thus purified ester salts in the remaining aqueous solution are converted back into their mono-esters which are saponified to a purified mixture of carbinols from which the epi-allo-pregnan-ol-3-one-20 is separated, by a ketone reagent such as semicarbazide, from non-ketonic alcohols, and the semicarbazone fraction finally decomposed to give epi-allo-pregnan-ol-3-one-20.

It has now been found that epi-pregnan-ol-one can be isolated from the mother liquors when filtering off the solid epi-allo-pregnan-ol-one semicarbazone as described in Serial No. 130,582. Apparently this is possible because the semicarbazone of epi-pregnan-ol-one is more soluble than the semicarbazone of its isomer, epi-allo-pregnan-ol-one.

It will thus be seen that the present invention embodies a new process for the preparation of pregnanolone compounds comprising the following steps:

1. Treating a carbinol fraction of human pregnancy urine, from which phenols and phenolic estrogenic hormones have been removed, with a dibasic organic acid acylating agent to convert the alcohols in said carbinol fraction into their corresponding acid mono esters.

2. Reacting the said mono acid esters with a basic or alkaline reagent to convert them into their water-soluble ester salts.

3. Separating the ester salts in aqueous solution from water-insoluble impurities by washing out the aqueous solution with water-immiscible organic solvent.

4. Converting the separated and purified ester salts into their acid mono esters by treatment with acid.

5. Saponifying the mono esters to produce a purified mixture containing epi-allo-pregnan-ol-3-one-20 and epi-pregnan-ol-3-one-20.

6. Treating the purified mixture from Step 5 with a ketone reagent capable of reacting with the two pregnanolones but not with non-ketonic alcohols.

7. Separating the mixture of ketone derivatives of Step 6 from non-ketonic compounds.

8. Crystallizing out the less soluble epi-allo-pregnan-ol-3-one-20 derivative from an organic solvent in which the two ketone derivatives have different solubilities and separating the crystals from the mother liquor.

9. Crystallizing out the more soluble epi-pregnan-ol-3-one-20 derivative from the mother liquor of Step 8 above.

10. Separately regenerating purified epi-allo-pregnan-ol-3-one-20 and epi-pregnan-ol-3-one-20 from the crystalline products of Steps 8 and 9 and removing the regenerated pregnanolone in each case from the decomposition products of this step.

I have also found that a new 3-epi-pregnandiol can be obtained by reduction of the new epi-pregnan-ol-one of this invention. The new pregnandiol differs structurally from natural pregnandiol found in pregnancy urine apparently only by having a different configuration of the hydroxyl group at $C_{20}$. The discoveries upon which the invention is based indicate that the female sex hormone, progesterone, is eliminated from the female organism as a mixture of its reduction products, namely, epi-pregnan-ol-one and epi-allo-pregnan-ol-one. This is further borne out by the fact that no unreduced progesterone has been found in sterol fractions from human pregnancy urine. This reduction of progesterone may be diagrammatically illustrated as follows:

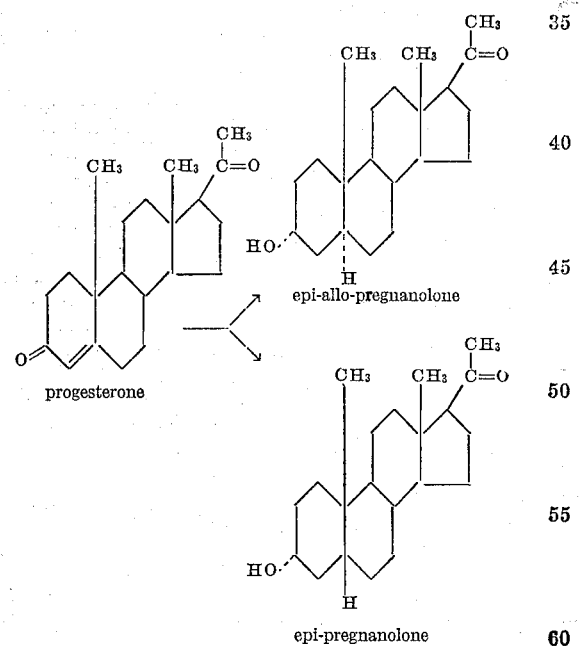

I have further found that the known compound, pregnandione, can be directly prepared by oxidizing the new epi-pregnan-ol-one.

The invention will be more fully understood by reference to the following examples, intended merely as illustrations of the invention without limiting it to the specific materials and conditions given therein.

EXAMPLE 1.—*Isolation of epi-pregnan-ol-one.*— One starts with a quantity of the alcoholic mother liquor filtered off from a semicarbazone fraction prepared from human pregnancy urine, said fraction containing solid semicarbazone of epi-allo-pregnan-ol-one, as described in my copending application, Serial Number 130,582. The mother liquor is concentrated to a small volume and cooled. A crystalline product separates out and is filtered off and then recrystallized from alcohol to a constant melting-point of 248° C. This semicarbazone of epi-pregnan-ol-one gives a depression in melting-point of 15° when mixed with the semi-carbazone of epi-allo-pregnan-ol-one.

Anal. calc. for $C_{22}H_{37}N_3O_2$: C, 70.3; H, 9.9. Found: C, 70.5; H, 10.0.

3 grams of the semicarbazone of epi-pregnan-ol-one is dissolved in 150 cc. of alcohol and then 15 cc. of sulfuric acid in 30 cc. of water is added to the alcoholic solution. The mixture is then refluxed for one hour, diluted with water and extracted with ether. The ether extract is evaporated to remove the ether and the residue is sublimed in a high vacuum at 130° C. The sublimate is then crystallized from its solution in 50% acetone. It may be crystallized from acetone again, if necessary, until a constant melting-point of 136° C. is obtained. This is pure epi-pregnan-ol-one. It does not precipitate with digitonin and does not absorb bromine. Mixed with pregnan-ol-20-one-3, a depression of 21° in melting-point is produced.

Anal. calcd. for $C_{21}H_{34}O_2$: C, 79.2; H, 10.8. Found: C, 79.2; H, 10.7.

EXAMPLE 2.—*Preparation of the acetate of epi-pregnan-ol-one.*—100 mg. of epi-pregnan-ol-one in 5 cc. of acetic anhydride is refluxed about ½ hour. The excess acetic anhydride is then evaporated off and the residue crystallized from 70% acetone to give crystals of pure acetate of epi-pregnan-ol-one melting at 99° C.

Anal. calcd. for $C_{23}H_{36}O_3$: C, 76.8; H, 10.1. Found: C, 76.5; H, 10.2.

EXAMPLE 3.—*Oxidation of epi-pregnan-ol-one to pregnandione.*—50 mg. of chromic oxide in 25 cc. of acetic acid is added to 100 mg. of epi-pregnan-ol-one in 15 cc. of acetic acid at room temperature. The mixture is allowed to stand at 15° C. for 12 hours and then for 3 hours at room temperature. Water is added and the product is extracted with ether. The ether extract is washed with sodium carbonate solution. The ether is then evaporated from the washed ether solution and the residue sublimed under high vacuum at 100° C. The sublimed pregnandione thus obtained is then crystallized from dilute acetone to give pure crystals melting at 120° C. No depression in melting-point is obtained upon mixing this product with an authentic sample of pregnandione obtained by oxidation of pregnandiol.

Anal. calc. for $C_{21}H_{32}O_2$: C, 79.7; H, 10.2. Found: C, 79.8; H, 10.5.

EXAMPLE 4.—*Reduction of epi-pregnan-ol-one to a pregnandiol.*—100 mg. of Adam's platinum oxide catalyst is added to a solution of 100 mg. of epi-pregnan-ol-one in 100 cc. of acetic acid. The solution is shaken with hydrogen at 45 pounds pressure for 3 hours. The acetic acid containing the reduction product is filtered off from the catalyst and separated from the filtrate in the customary manner for this method of hydrogenation. The reduction product is then crystallized from alcohol and washed with ether to give pure crystals of a pregnandiol melting at 230° C. This diol mixed with pregnandiol melting at 242° C. gives a depression in melting-point to 215° C. This new diol therefore differs from natural pregnandiol only in the configuration of the hydroxyl group attached to carbon atom 20 of the pregnane molecular framework. The new diol does not precipitate with the digitonin, thus showing that the original hydroxyl group is attached to the 3-carbon atom with the epi-configuration.

Anal. calc. $C_{21}H_{36}O_2$: C, 78.8; H, 11.3. Found: C, 78.6; H, 11.3.

What I claim as my invention is:

1. Process for the preparation of pregnanolone compounds which comprises treating a carbinol fraction of human pregnancy urine, from which phenols and phenolic estrogenic hormones have been removed, with a dibasic organic acid acylating agent to convert the alcohols in said carbinol fraction into acid mono esters, reacting the acid mono esters with a basic reagent to convert them into their water-soluble ester salts, separating the ester salts in aqueous solution from water-insoluble impurities, converting the separated and purified ester salts into their acid mono esters by treatment with acid, saponifying the mono esters to produce a purified mixture containing epi-allo-pregnanol-3-one-20 and epi-pregnanol-3-one-20, removing said pregnanolones from non-ketonic alcohols by reacting them with a ketone reagent, separating the two ketone derivatives obtained, crystallizing out the least soluble of the two derivatives from an organic solvent in which they have different solubilities, crystallizing out the more soluble pregnanolone derivative from the mother liquors of the first crystallization and separately regenerating and separating out purified epi-allo-pregnanol-3-one-20 and epi-pregnanol-3-one-20.

2. Process of making a pregnandiol which comprises reducing a member of the group consisting of epi-allo-pregnanol-3-one-20 and epi-pregnanol-3-one-20.

3. Epi-pregnanol-3-one-20 having a melting point of approximately 136° C.

4. A pregnandiol melting at approximately 230° C. which does not form an insoluble digitonide with digitonin.

5. Process for the separation of ketonic alcohols having a cyclopentano-10,13-dimethyl polyhydrophenanthrene nucleus from non-ketonic alcohols having a cyclopentano-10,13-dimethyl polyhydrophenanthrene nucleus in a carbinol fraction from human pregnancy urine which comprises converting the alcohols in said fraction to water-soluble ester derivatives, separating the latter from water-insoluble impurities, saponifying the ester derivatives to a purified mixture of ketonic and non-ketonic alcohols, reacting the latter mixture with a ketone reagent, and separating the reaction product of the ketonic alcohols with the ketone reagent from the unreacted non-ketonic alcohols to obtain purified derivatives of ketonic alcohols from which the purified ketonic alcohols may be regenerated.

6. Compounds of the pregnane series having the following formula:
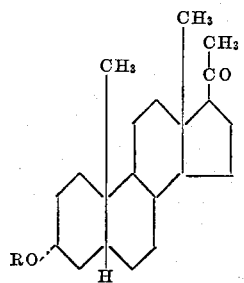
where RO— is a member of the group consisting of hydroxyl and an organic carboxylic acid ester radical, the compound in which RO is OH, not being precipitated by digitonin.
7. The acetate of epi-pregnanol-3-one-20 having a melting point of approximately 99° C.
RUSSELL EARL MARKER.